(12) United States Patent
Ichinose et al.

(10) Patent No.: US 11,505,150 B2
(45) Date of Patent: Nov. 22, 2022

(54) MOVEMENT APPARATUS AND MOVEMENT APPARATUS SYSTEM

(71) Applicant: Hitachi, Ltd., Tokyo (JP)

(72) Inventors: Ryoko Ichinose, Tokyo (JP); Tooru Miyasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 267 days.

(21) Appl. No.: 16/753,817

(22) PCT Filed: Sep. 7, 2018

(86) PCT No.: PCT/JP2018/033166
§ 371 (c)(1),
(2) Date: Apr. 6, 2020

(87) PCT Pub. No.: WO2019/097821
PCT Pub. Date: May 23, 2019

(65) Prior Publication Data
US 2020/0247343 A1    Aug. 6, 2020

(30) Foreign Application Priority Data
Nov. 17, 2017   (JP) .............................. JP2017-221511

(51) Int. Cl.
*B60R 21/08*   (2006.01)
*B60R 22/48*   (2006.01)

(52) U.S. Cl.
CPC .............. *B60R 21/08* (2013.01); *B60R 22/48* (2013.01)

(58) Field of Classification Search
CPC ......... B60R 21/01; B60R 21/02; B60R 21/08; B60R 2021/0002; B60R 2021/0027;
(Continued)

(56) References Cited

U.S. PATENT DOCUMENTS

| 5,825,283 A | 10/1998 | Camhi et al. |
| 2013/0183957 A1 | 7/2013 | Iwasaki |
| 2022/0043461 A1* | 2/2022 | Nguyen ............... G05D 1/0295 |

FOREIGN PATENT DOCUMENTS

| CN | 101248469 A | 8/2008 |
| JP | 56-146441 A | 11/1981 |
| (Continued) | | |

OTHER PUBLICATIONS

Chinese Office Action issued in corresponding Chinese Application No. 201880066524.7 dated Oct. 12, 2021.
(Continued)

*Primary Examiner* — James A English
*Assistant Examiner* — Mary E Young
(74) *Attorney, Agent, or Firm* — Mattingly & Malur, PC

(57) ABSTRACT

Provided is a movement apparatus that can ensure safety to a movement apparatus user even without safety knowledge about a safety device of the movement apparatus. The movement apparatus of the invention includes a safety device that is configured to restrain an occupant or a baggage, an information presentation unit that is configured to present safety device information related to the safety device, an information input unit that is configured to input consent information that consents a start of traveling in a current state of the safety device, and a travel mechanism that starts traveling only when the consent information is input.

5 Claims, 7 Drawing Sheets

(58) Field of Classification Search
CPC ............ B60R 22/48; B60R 2022/4883; B60R 2022/4891; G05D 1/0293; G05D 1/0295; G08G 1/22
See application file for complete search history.

(56) References Cited

FOREIGN PATENT DOCUMENTS

| JP | 2006-117046 A | | 5/2006 | | |
|----|---------------|---|--------|---|---|
| JP | 2006-290058 A | | 10/2006 | | |
| JP | 2006338117 A | * | 12/2006 | | |
| JP | 2009080804 A | * | 4/2009 | ........... | G05D 1/0295 |
| JP | 2016-199207 A | | 12/2016 | | |
| JP | 2017-067466 A | | 4/2017 | | |
| JP | 2017-178316 A | | 10/2017 | | |
| JP | 2020069952 A | * | 5/2020 | .......... | B60W 30/165 |
| JP | 2020087261 A | * | 6/2020 | | |
| KR | 20160071986 A | * | 6/2016 | | |

OTHER PUBLICATIONS

International Search Report of PCT/JP2018/033166 dated Dec. 4, 2018.

\* cited by examiner

[FIG. 1]
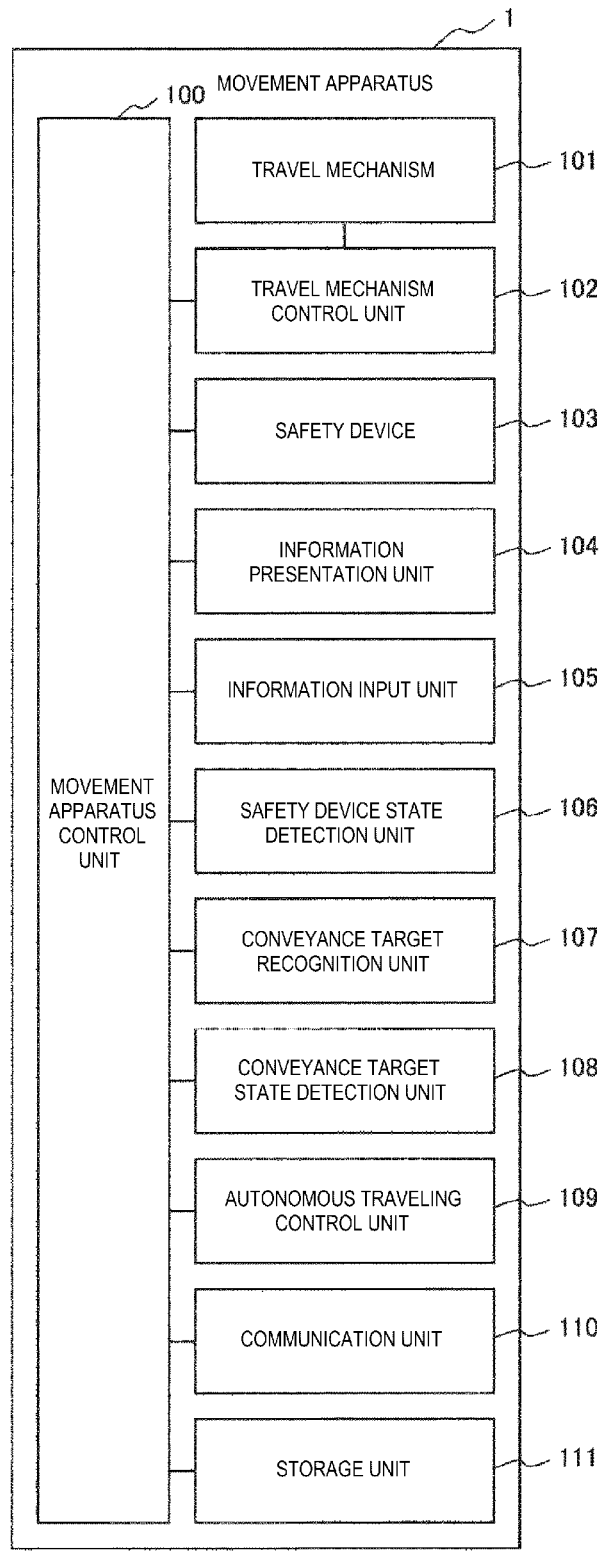

[FIG. 2]
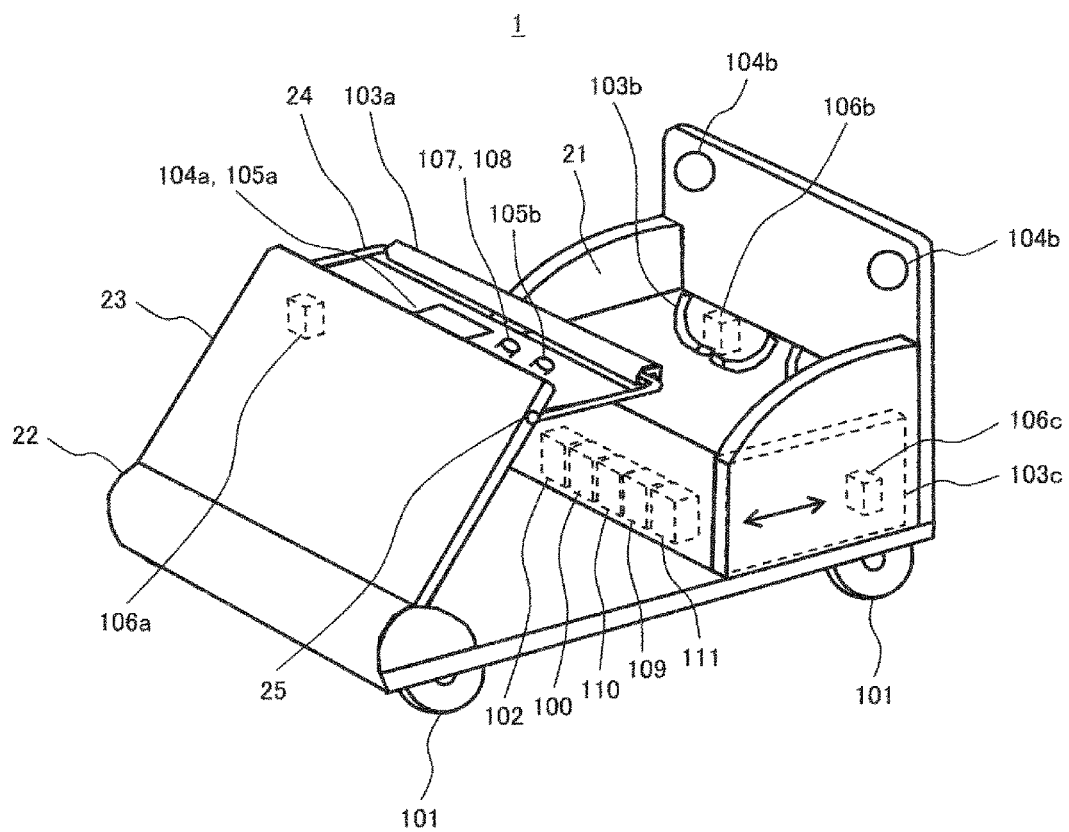

[FIG. 3]
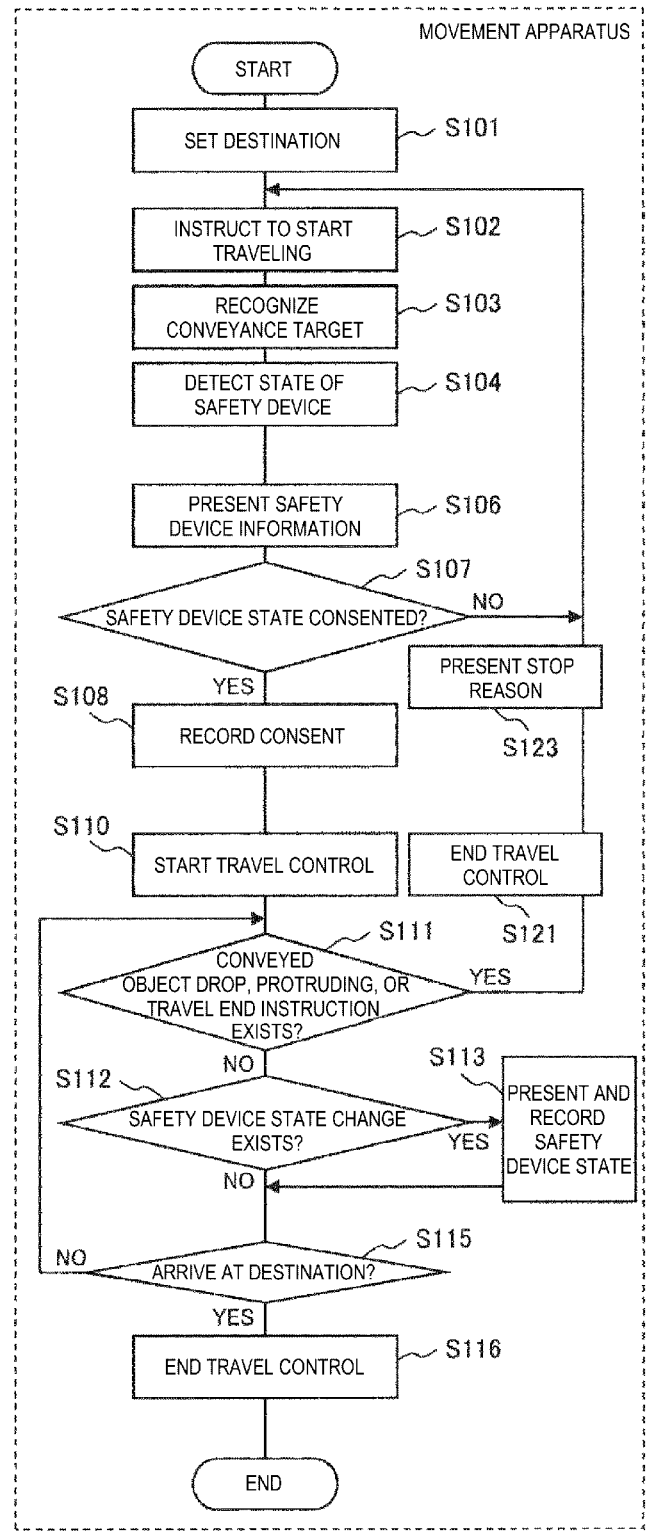

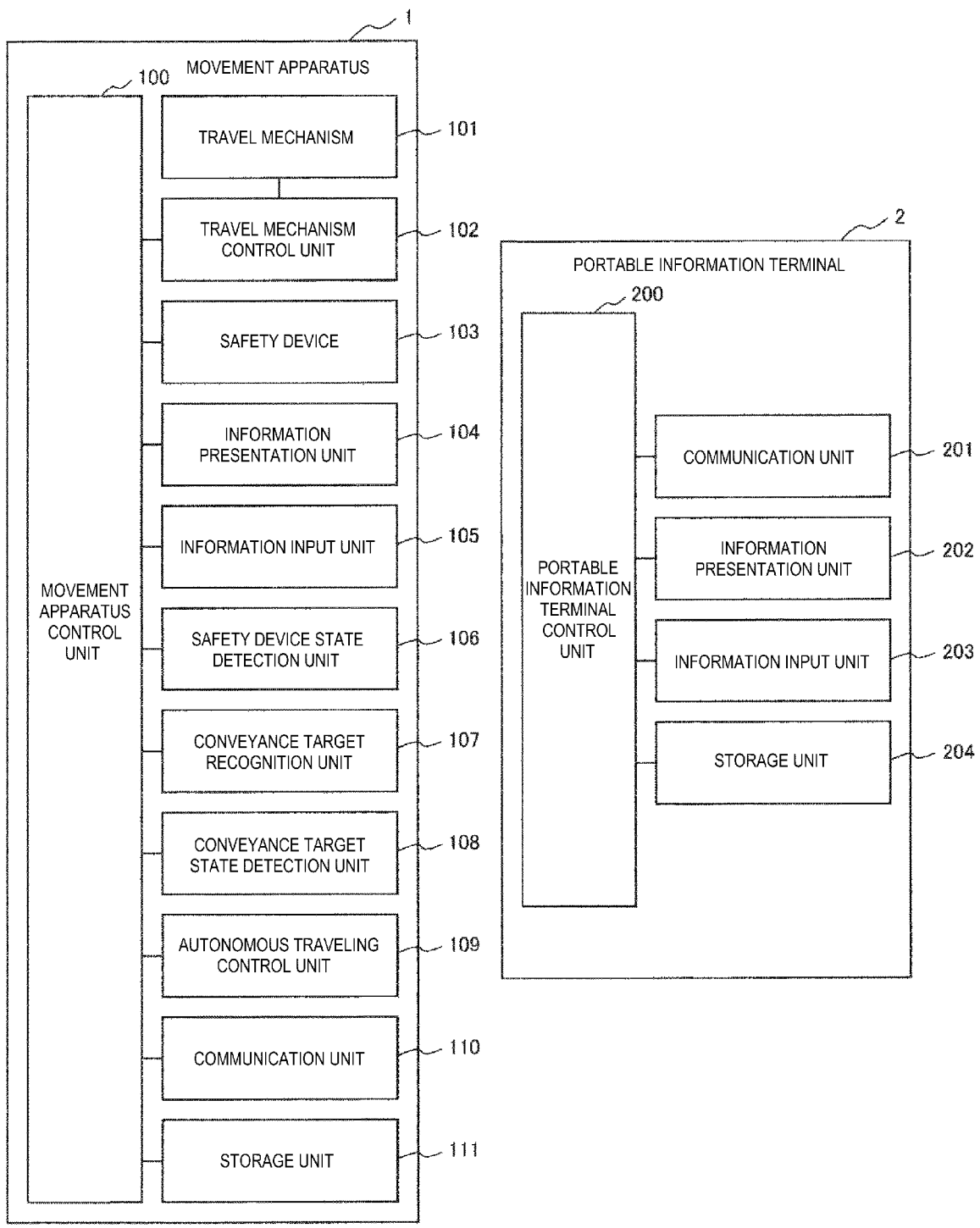
[FIG. 4]

[FIG. 5]
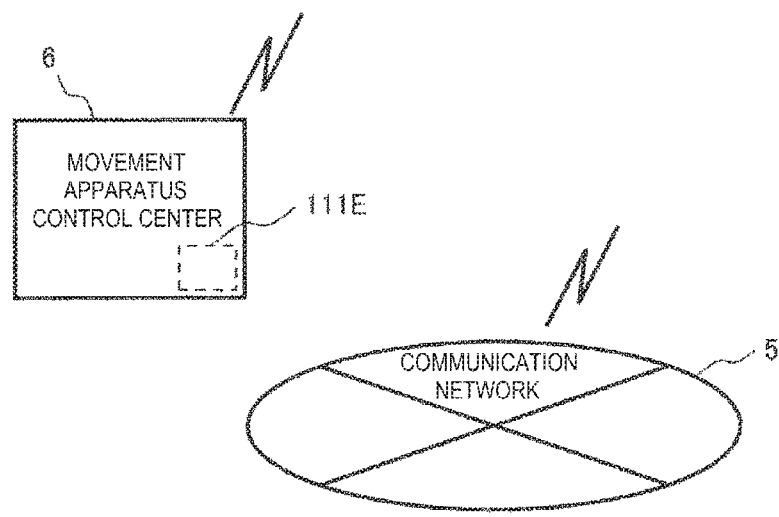
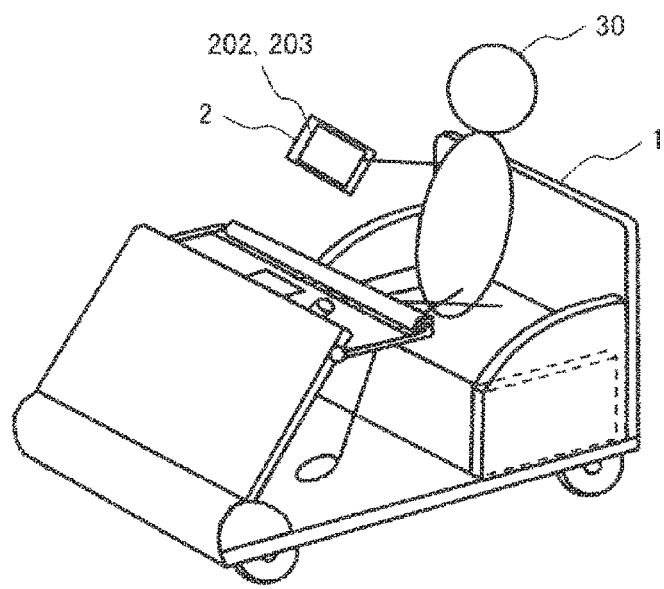

[FIG. 6]
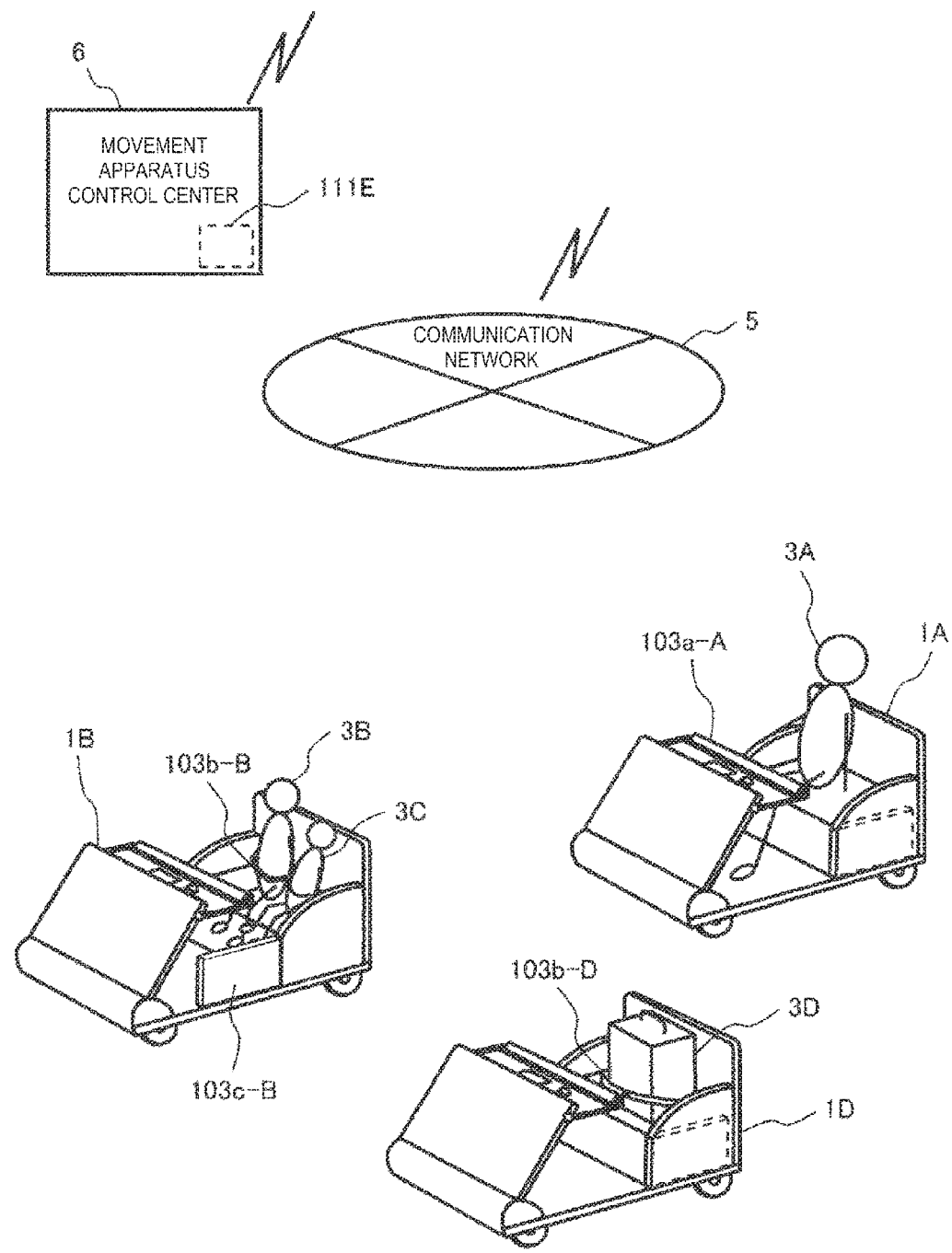

[FIG. 7]
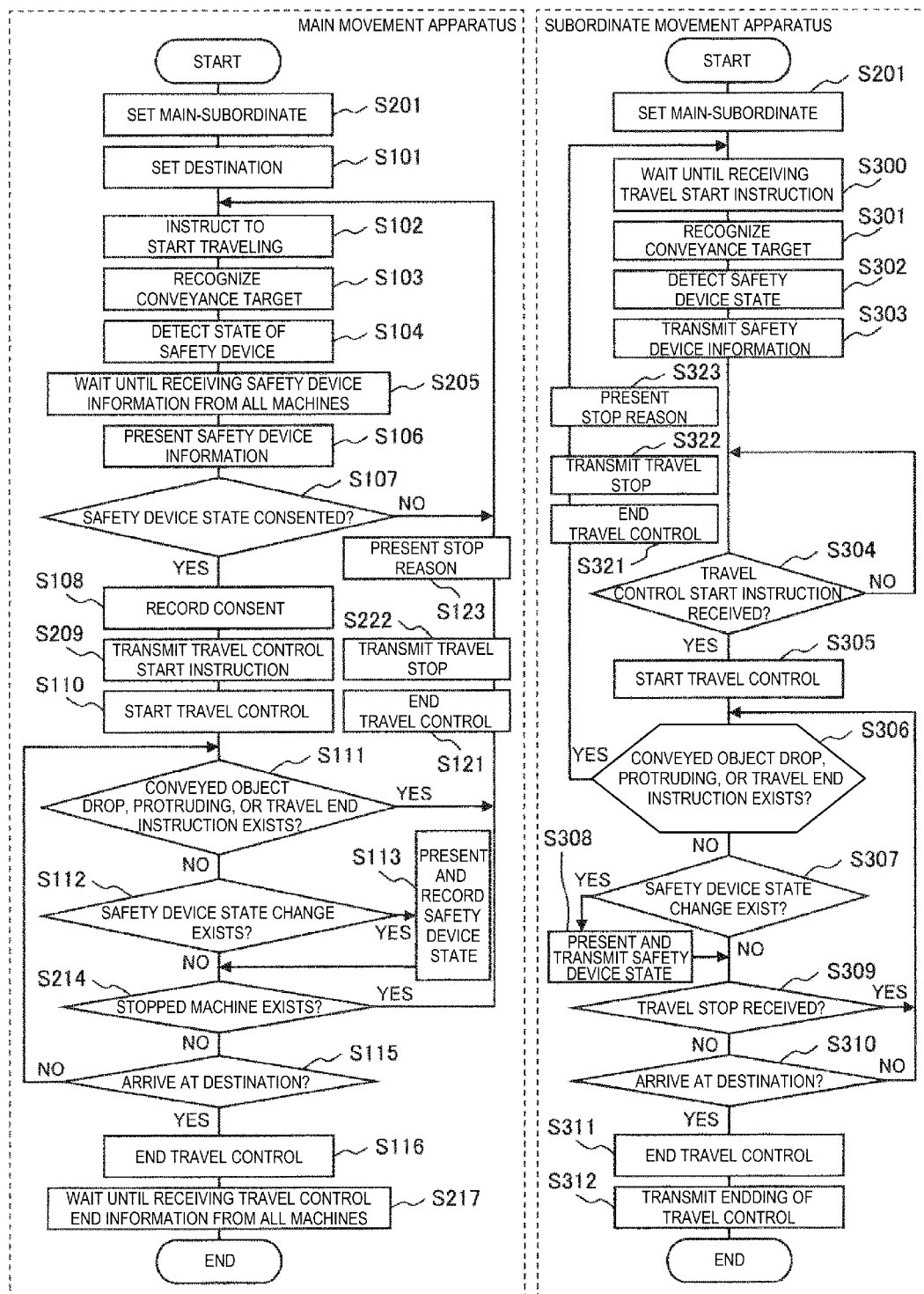

MOVEMENT APPARATUS AND MOVEMENT APPARATUS SYSTEM

TECHNICAL FIELD

The present invention relates to a movement apparatus for placing and moving a person or a baggage, and a movement apparatus system.

BACKGROUND ART

In recent years, an autonomous movement apparatus that autonomously moves with a person or a baggage placed thereon, such as a wheelchair-typed autonomous moving robot or a person tracking-typed baggage conveying robot, is being developed while assuming the apparatus being used in an environment where walking through a relatively long distance such as an airport lobby is necessary. Since the autonomous movement apparatus autonomously move in an environment crowded with people rather than on a dedicated road, a moving speed is limited to around a walking speed and the apparatus stops in an emergency immediately to ensure safety of people in the surrounding if there is a risk of colliding with people. Since the moving speed is low, the autonomous movement apparatus of this type usually does not include a safety device such as a seat belt. Further, since it is assumed that a frequency of an elderly person riding alone is high, a seat is usually large in size for an adult alone.

When a child or a baggage is placed on such an autonomous movement apparatus, the child or the baggage may be accidentally dropped at a time of an emergency stop. Accordingly, passage of people in the surrounding may be troubled.

As a method of ensuring safety of an occupant, for example, as disclosed in PTL 1, there is known a method of determining whether a presence on a seat of an automobile is an adult, a child, or a baggage and detecting whether a safety device is used according to a determination result, and displaying a warning or limiting a speed when a suitable safety device is not used. It is also conceivable to apply this technique to the autonomous movement apparatus described above.

CITATION LIST

Patent Literature

PTL 1: JP-A-2006-117046

SUMMARY OF INVENTION

Technical Problem

However, since PTL 1 describes a technique that is assumed to be applied to an automobile, it is highly possible that a user or the like who uses the autonomous movement apparatus for the first time cannot operate the safety device even when the technique is directly applied to an autonomous movement apparatus that is temporarily borrowed from an airport lobby or the like.

That is, when the user is not aware of the safety device such as a seat belt or has low safety awareness, an autonomous traveling is started without using the safety device and safety may not be ensured sufficiently.

Therefore, an object of the invention is to provide a movement apparatus capable of properly ensuring safety of a user even one who uses the movement apparatus for the first time by starting operation after providing the user with information about an equipped safety device and approving a current state of the safety device.

Solution to Problem

In order to solve the problem, a movement apparatus of the invention includes a safety device that is configured to restrain an occupant or a baggage, an information presentation unit that is configured to present safety device information related to the safety device, an information input unit that is configured to input consent information that consents a start of traveling in a current state of the safety device, and a travel mechanism that starts traveling only when the consent information is input.

In addition, a movement apparatus includes a safety device that is configured to restrain an occupant or a baggage, an information presentation unit that is configured to present safety device information related to the safety device, an information input unit that is configured to input consent information that consents a start of traveling in a current state of the safety device, and a travel mechanism that starts traveling after the consent information is input.

Advantageous Effect

According to the movement apparatus of the invention, an effect can be achieved that autonomous traveling can be started in a state corresponding to characteristics of the user since the user can obtain knowledge about the safety device equipped in the movement apparatus before traveling and the movement apparatus starts traveling after the user determines whether a state of the safety device is suitable for the characteristics of the user.

BRIEF DESCRIPTION OF DRAWINGS

FIG. 1 is a functional block diagram of a movement apparatus according to a first embodiment.

FIG. 2 is a perspective view of the movement apparatus according to the first embodiment.

FIG. 3 is a flowchart showing a control example of the movement apparatus according to the first embodiment.

FIG. 4 is a functional block diagram of a movement apparatus according to a second embodiment.

FIG. 5 is a schematic diagram of the movement apparatus according to the second embodiment.

FIG. 6 is a schematic diagram of a movement apparatus according to a third embodiment.

FIG. 7 is a flowchart showing a control example of the movement apparatus according to the third embodiment.

DESCRIPTION OF EMBODIMENTS

Embodiments will be described below with reference to drawings.

First Embodiment

FIG. 1 is a functional block diagram showing main elements of a movement apparatus 1 according to the first embodiment. The movement apparatus 1 is a movement apparatus assumed to be used in an environment crowded with people like an airport lobby, on which a person or a baggage can be placed and transported. Although the movement apparatus corresponds to both autonomous traveling and manual traveling, an autonomous traveling state will be described as an example below.

As shown in FIG. 1, the movement apparatus 1 includes a travel mechanism 101, a travel mechanism control unit 102, a safety device 103, an information presentation unit 104, an information input unit 105, a safety device state detection unit 106, a conveyance target recognition unit 107, a conveyance target state detection unit 108, an autonomous traveling control unit 109, a communication unit 110, and a storage unit 111, and further includes a movement apparatus control unit 100 that controls all of the above. Although the movement apparatus 1 also includes hardware such as an arithmetic unit such as a CPU, a main storage device such as a semiconductor memory, and an auxiliary storage device such as a hard disk which are not shown, and executes a program loaded from the auxiliary storage device to the main storage device by the arithmetic unit to implement some functions shown in FIG. 1, details of each configuration will be described below while omitting such well-known operations as appropriate.

The travel mechanism 101 includes a wheel, a motor, a brake, a steering device, and the like. The travel mechanism control unit 102 controls the travel mechanism 101 to cause the movement apparatus 1 to travel at a predetermined speed and in a predetermined direction, or to stop.

The safety device 103 is, for example, a safety bar 103a or a seat belt 103b that restrains an occupant or a baggage on a seat and prevents the occupant or the like from being thrown out of the vehicle when the vehicle stops in an emergency. The safety device state detection unit 106 detects a state of the safety device 103. Details will be described later.

The information presentation unit 104 presents information related to the safety device 103 (hereinafter, referred to as "safety device information") and the like to the occupant of the movement apparatus 1, and is a touch panel display, a speaker, or the like. The information input unit 105 is used by a user to input consent information and the like to be described later, and is, for example, a touch panel display, an input button, a microphone, or a voice recognition device.

The conveyance target recognition unit 107 recognizes a type of a person or a baggage on a seat, and includes, for example, a camera and image recognition device. The type that can be recognized by the conveyance target recognition unit 107 is, for example, a distinction between a person and a baggage, a distinction between an adult and a child, a size of a baggage, and the like.

The conveyance target state detection unit 108 detects a protruding or drop of the person or the baggage on the seat outside the movement apparatus 1, detects a slip down from the seat, and includes, for example, a camera, an image recognition device, and a laser range finder.

The autonomous traveling control unit 109 obtains a current position of the movement apparatus 1 by an arithmetic unit based on measurement information from such as a radio wave reception device, a camera, and a laser range finder which are not shown, plans a route to a destination avoiding surrounding objects, and controls the travel mechanism control unit 102 to travel along the route. The communication unit 110 is, for example, a Wi-Fi that communicates with an external communication device such as a portable information terminal. The storage unit 111 is, for example, a memory or a hard disk that records the safety device information and the consent information.

Next, the configuration of the movement apparatus 1 will be described more specifically with reference to the perspective view of FIG. 2.

As shown here, the movement apparatus 1 in the present embodiment includes a seat 21 on which an adult can be seated, and a baggage can also be placed on the seat 21. A backrest of the seat 21 is provided with an information presentation unit 104b (speaker) that presents the safety device information by sound.

A bumper 22 and a front panel 23 are provided in a front portion of the movement apparatus 1. On an upper portion of the front panel 23, a small table 24 is provided to place a small object thereon. The small table 24 is provided with the touch panel display that functions as the information presentation unit 104a and the information input unit 105a, a camera that functions as the conveyance target recognition unit 107 and the conveyance target state detection unit 108, and a microphone that functions as an information input unit 105b to input consent information by sound.

The movement apparatus 1 in the present embodiment is assumed to be applied to travel a short distance at a low speed, and is easy to get on and off by omitting a door so that the movement apparatus can be used conveniently. Along with this, three types of safety devices (safety bar 103a, seat belt 103b, and slide walls 103c) are equipped to prevent a user or a baggage from dropping.

The safety bar 103a can be rotated from a substantially vertical state to a substantially horizontal state with reference to a shaft 25. The safety bar 103a is in the substantially vertical state when the user is getting on and off, and tilts into the substantially horizontal state after the user is seated on the seat 21. By positioning the safety bar 103a above a thigh of the user, a movement of a body of the user is limited and a drop from the movement apparatus 1 is prevented.

Although dropping can be prevented by the safety bar 103a for a physique of a general adult, a person of small size or a child may slip off under the safety bar 103a and drop, and therefore the seat belt 103b is also equipped. The seat belt 103b can also be used to fix a baggage placed on the seat 21.

In addition, in a case where a user during a ride drops a baggage, it is dangerous when the baggage drops outside the movement apparatus 1 since the baggage may collide with people in the surrounding or cause people in the surrounding to stumble. In particular, the child is highly possible to drop a toy or the like held by a hand. In order to prevent this, the slide walls 103c that close exits and entrances on both side surfaces of the movement apparatus 1 are also equipped. Although the slide walls 103c are housed in a space beside the seat 21 for easily getting on and off when not in use, the slide walls 103c are pulled out to close the exits and entrances at a time of use.

The three safety devices are provided with safety device state detection units 106a, 106b, and 106c to detect states of the safety devices respectively. The safety device state detection unit 106a detects whether the safety bar 103a is in the substantially horizontal state, the safety device state detection unit 106b detects whether the seat belt 103b is tightened, and the safety device state detection unit 106c detects whether the slide walls 103c are pulled out.

Next, an example of a flow of operation of the movement apparatus 1 will be described with reference to FIG. 3.

When the movement apparatus 1 is not in use, a map of an airport lobby and the like or a destination option is displayed on the information presentation unit 104a such as a touch panel display. Then, the user who rides on the movement apparatus 1 sets a destination using the information input unit 105a such as the touch panel display or the information input unit 105b such as the microphone (S101). The user then inputs an instruction to start traveling by touching a "travel start button" of the information input unit 105a or by a sound of start traveling via the information input unit 105b (S102).

Then, the conveyance target recognition unit 107 recognizes the type and the number of an object present on the seat 21 (S103). The safety device state detection units 106a, 106b, and 106c detect the state of each safety device 103 (S104).

Then, the information presentation units 104a and 104b are used to present the safety device information to the user (S106). The safety device information presented in S106 is an introduction of each safety device equipped in the movement apparatus 1, which is helpful for the user to understand safety when a safety device is recommended according to the type of the occupant or the baggage recognized by the conveyance target recognition unit 107 or a traveling speed.

For example, when a desired traveling speed can be specified in S102 and a "normal speed" is specified, the safety device information is presented as "The seat belt 103b is not necessary for an adult in a normal speed traveling. Dropping can be prevented only by the safety bar 103a. It is desirable that a child always wears the seat belt 103b. When used in a high-speed traveling, it is also desirable for an adult to wear the seat belt 103b. The slide wall 103c is recommended as well when used by a child only or a child holding toys."

Further, it is helpful for the user to understand the safety more easily when result information of the conveyance target recognition unit 107 and the safety device state detection units 106a, 106b, and 106c are also used as the safety device information. For example, a list of detection results of the safety device state detection unit 106a, 106b, and 106c is presented to the information presentation unit 104a, and the safety device information is presented as "The safety bar 103a is raised. Please get off. There may be a child. The child may not be wearing the seat belt 103b. Please tighten the seat belt 103b of the child. There may be a baggage, please fix the baggage with the seat belt 103b."

Then, via the information presentation units 104a and 104b, the user is prompted to determine whether to start traveling in a current state of the safety device (for example, with the seat belt 103b unused) (S107). When the user inputs a determination that the user may start traveling in the current state of the safety device using the information input units 105a and 105b (YES in S107), the user records "consent information" serving as an evidence that the user may determine to start traveling in the current state of the safety device in the storage unit 111 (S108). The consent information is current states of each safety device 103 which are time at which the same information is recorded, the current position of the movement apparatus 1, and the like.

On the other hand, in S107, when it is input not to start traveling in the current state of the safety device (NO in S107), the process returns to S102 to wait for a travel start instruction.

When the consent information is recorded in S108, an autonomous traveling control toward the set destination starts (S110). During the autonomous traveling, the conveyance target state detection unit 108 detects whether a conveyed object protrudes from both front and rear sides of the movement apparatus 1 or whether there is a dropped baggage (S111). When there is a protruding or dropped object, the autonomous traveling control ends (S121), and a reason for stopping the traveling is presented to the user via the information presentation units 104a and 104b (S123), for example, "Something may be dropped from a right side. Please stop and confirm that. After confirmation, please give an instruction to start traveling.", and the process returns to S102 to wait for a travel start instruction. In step S111, when the user who rides on the movement apparatus 1 inputs an instruction by touching a "travel stop button" of the information input unit 105a such as the touch panel display or by a sound of stop traveling via the information input unit 105b, the autonomous traveling control also ends (S121), and a reason for stopping the traveling is presented to the user via the information presentation units 104a and 104b (S123), for example, "Stop because of a given traveling stop instruction. When restarting traveling, please give an instruction to start traveling.", and the process returns to S102 to wait for a travel start instruction.

When the state of the safety device 103 changes such as removing the seat belt 103b by the user and outputs of the safety device state detection units 106a, 106b and 106c change (S112), the change of the safety device state is presented to the user via the information presentation units 104a and 104b and safety device state information is recorded in the storage unit 111 (S113). The safety device state information is current states of each safety device 103 which are time at which the same information is recorded, the current position of the movement apparatus 1, and the like.

When the autonomous traveling control unit 109 detects a destination arrival of the movement apparatus 1 (YES in S115), the autonomous traveling control ends (S116). On the other hand, until arriving at the destination (NO in S115), the processing of S111 and subsequent steps are repeated.

When a safety level is set in advance according to a combination of the type of a conveyance target and the state of the safety device and the safety level is low at a time point of start of a travel control (S110), safety measures may be performed such as reducing a maximum speed when traveling, reducing an acceleration and a deceleration, reducing a speed on a curve, selecting a route with less curve, selecting a wide route, and selecting a less crowded route. Similarly, when the state of the safety device is changed in S112 and the safety level is changed, safety measures are also changed accordingly.

According to the configuration of the present embodiment described above, an effect can be achieved that the autonomous traveling can be started in a state corresponding to characteristics of the user since the user can always obtain knowledge about the safety device equipped in the movement apparatus before traveling and the movement apparatus starts traveling after the user determines whether a state of the safety device is suitable for the characteristics of the user.

The above described the movement apparatus 1 including all the configurations shown in FIG. 1 to cope with an autonomous movement. However, when only coping with manual traveling is sufficient, the movement apparatus 1 with a simple structure may be used in which the safety device state detection unit 106, the conveyance target recognition unit 107, the conveyance target state detection unit 108, the autonomous traveling control unit 109, the communication unit 110, and the storage unit 111 are omitted. In this case, a proceeding direction, a speed, a stop position and the like of the movement apparatus 1 may be input in a timely manner using the information input unit 105.

Second Embodiment

Next, the second embodiment will be described with reference to FIG. 4. Repetitive descriptions of common points as in the first embodiment are omitted.

In the first embodiment, the function of the information presentation unit 104 is performed by a touch panel display (information presentation unit 104*a*) provided on the small table 24 or a speaker (information presentation unit 104*b*) provided on the seat 21, the function of the information input unit 105 is performed by a touch panel display (information input unit 105*a*) or a microphone (information input unit 105*b*) provided on the small table 24, and the consent information is stored in the storage unit 111. In contrast, in the present embodiment, a portable information terminal 2 owned by a user 30 functions as the information presentation unit 104, the information input unit 105, and a device for recording the consent information.

FIG. 4 is a functional block diagram of the movement apparatus 1 and the portable information terminal 2 used in the present embodiment. The movement apparatus 1 is the same as that in the first embodiment and the portable information terminal 2 is a so-called smartphone.

As shown here, the portable information terminal 2 includes a communication unit 201 capable of communicating with the communication unit 110 of the movement apparatus 1, an information presentation unit 202 such as a touch panel display and a speaker, an information input unit 203 such as a touch panel display, a microphone, and a voice recognition device, and a portable information terminal control unit 200 that controls the above.

As shown in FIG. 5, the movement apparatus 1 and the portable information terminal 2 can communicate with each other directly or via a communication network 5. The movement apparatus 1 and the portable information terminal 2 can communicate with a movement apparatus control center 6 that controls the movement apparatus 1 via the communication network 5. In the movement apparatus control center 6, a storage unit 111E such as a hard disk is installed, which can store consent information transmitted from the movement apparatus 1 or the portable information terminal 2. Accordingly, in the configuration of the present embodiment, even when the movement apparatus 1 fails, a state of a safety device at the time of autonomous traveling can be grasped from the consent information stored in the storage unit 111E of the movement apparatus control center 6.

Next, a flow of operation by the configuration of the embodiment will be described with reference to the flowchart of FIG. 3. Since the present embodiment is the same as that in the first embodiment except for an interface part related to the user, points overlapping with the description of FIG. 3 in the first embodiment will be omitted as appropriate.

First, in S101, information required for destination setting is presented to the information presentation unit 104*a* of the movement apparatus 1, transmitted to the communication unit 201 of the portable information terminal 2 via the communication unit 110, and is also presented to the information presentation unit 202. Then, when the user sets a destination with the information input unit 203 of the portable information terminal 2, the destination information is transmitted from the communication unit 201 to the communication unit 110, and the process proceeds to S102.

Similarly, in S102, information required for travel start instruction is presented to the information presentation unit 104*a*, transmitted to the communication unit 201 via the communication unit 110, and presented to the information presentation unit 202. When the user inputs a travel start instruction with the information input unit 203, the travel start instruction is transmitted from the communication unit 201 to the communication unit 110, and the process proceeds to S103.

Similarly, in S106, safety device information is presented to the information presentation units 104*a* and 104*b*, transmitted to the communication unit 201 via the communication unit 110, and presented to the information presentation unit 202. Then, when a determination whether the user may start traveling in this state is input by the information input unit 203, the information is transmitted from the communication unit 201 to the communication unit 110 together with user identification information such as a user name stored in the storage unit 204 of the portable information terminal 2, and the process proceeds to S108 or S102 according to the content.

In S108, consent information including the user identification information is recorded in the storage unit 111. Then, the user identification information, machine identification information of the movement apparatus 1, and the consent information are transmitted to the movement apparatus control center 6 via the communication unit 110 and the communication network 5, and are stored in the storage unit 111E.

In S113, the user identification information, the machine identification information, and the safety device state information are transmitted to the movement apparatus control center 6 and stored in the storage unit 111E.

In S123, a reason for stopping traveling is presented to both the information presentation unit 104 and the information presentation unit 202.

There are several methods of setting a communication target of the communication unit 110 of the movement apparatus 1 as the mobile information terminal 2 of a user riding on the movement apparatus 1. For example, there is a method of specifying an individual identification number in the movement apparatus 1, inputting the individual identification number to the information input unit 203 by the user, storing the information in the movement apparatus control center 6 when the information is transmitted to a public communication address of the movement apparatus control center 6 by the communication unit 201, reading the communication address of the individual identification number from a matching list of individual identification numbers and communication addresses of each movement apparatus 1, and sending back the communication address to the portable information terminal 2.

According to the configuration of the present embodiment described above, the user can acquire information from the movement apparatus 1 and instruct the movement apparatus 1 via the portable information terminal 2 kept by the user. Therefore, usability can be greatly improved. For example, the user can hear more clearly in the crowd if receiving a voice guidance via a headphone connected to the portable information terminal 2, and a chance of leaking the destination to people in the surrounding is reduced if information such as the destination is received from the touch panel display or the microphone of the portable information terminal 2.

Third Embodiment

Next, the third embodiment will be described with reference to FIGS. 6 and 7. Repetitive descriptions of common points as in the above-described embodiments are omitted.

Although only one movement apparatus 1 is shown in the first and second embodiments, the present embodiment will describe a case in which a method of grouping and collectively controlling a plurality of movement apparatuses is used.

FIG. 6 exemplifies a situation in which three movement apparatuses 1A, 1B, and 1D are traveling in a group. A parent 3A rides on the movement apparatus 1A, children 3B and 3C ride on the movement apparatus 1B, and a baggage 3D is placed on the movement apparatus 1D. Only a safety bar 103a-A is used as the safety device 103 on the movement apparatus 1A on which the parent 3A rides, all safety devices (103a-B, 103b-B, and 103c-B) are used on the movement apparatus 1B on which the children 3B and 3C ride, and a safety bar 103a-D and a seat belt 103b-D are used on the movement apparatus 1D on which the baggage 3D is placed. In addition, the movement apparatus 1A on which the parent 3A rides travels at the end of the group so as to be able to move while watching states of the children 3B and 3C and the baggage 3D.

A flow of operation up to traveling in a group will be described with reference to FIG. 7. In FIG. 7, a flowchart on a left side is a processing executed by a main movement apparatus and a flowchart on a right side is a processing executed by a subordinate movement apparatus. The same processing as those in FIG. 3 are denoted by the same step number, and a repetitive description thereof will be omitted.

First, for each movement apparatus 1, a main-subordinate setting is performed to clarify which machines belong to one group, which machine is a main movement apparatus and which machine is a subordinate movement apparatus (S201). Since a main-subordinate relationship can be set on each movement apparatus 1, S201 is arranged in both flowcharts on the left side and on the right side.

There are several main-subordinate setting methods. For example, when a user inputs a group number by the information input unit 105 of each movement apparatus, the group number and an individual identification number of each movement apparatus is broadcasted and transmitted by the communication unit 110 of each movement apparatus and received by all movement apparatuses, and movement apparatuses that receive the same group number are regarded as one group. When the user performs a main movement apparatus setting by one information input unit 105, the information together with its own individual identification number are broadcasted and transmitted by the communication unit 110 and received by all movement apparatus, and another movement apparatus of the same group become subordinate movement apparatus. As another method, an individual identification number is specified in each movement apparatus, all individual identification numbers in one group are input to one movement apparatus by the user by the information input unit 105 of the movement apparatus, and the main movement apparatus setting is performed to the individual identification number of the movement apparatus. The communication unit 110 transmits the information to all the movement apparatuses.

As another method, when the user inputs the number of required movement apparatuses by the information input unit 203 of the portable information terminal 2, the communication unit 201 transmits the input number, current position information of the portable information terminal 2 acquired by a current position information acquisition unit (not shown) of the portable information terminal 2 provided in the portable information terminal 2 and a movement apparatus requirement communication message to the movement apparatus control center 6, the movement apparatus control center 6 transmits a travel instruction for going to the current position of the portable information terminal 2 to the requested number of the movement apparatuses 1 based on the received information, sets one of the movement apparatuses as a main movement apparatus, and transmits individual identification number information of the main movement apparatus to each movement apparatus.

Information that which movement apparatus is the main movement apparatus is presented to the user by the information presentation unit 104 or the information presentation unit 202. The main movement apparatus is ridden by a person in charge of the group (for example, parent 3A), which is presented to the user. When information is input by a portable information terminal, a portable information terminal of the person in charge of the group is used, which is also presented to the user.

Hereinafter, as in the example of FIG. 6, the movement apparatus 1A on which the parent 3A rides is set as a main movement apparatus and the other movement apparatuses 1B and 1D are set as subordinate movement apparatuses.

After the main-subordinate setting in S201, the subordinate movement apparatuses (1B and 1D) wait until a travel start instruction from the main movement apparatus (1A) is received (S300).

The parent 3A who is the person in charge of the group sets a destination by the information input unit 105 of the main movement apparatus or the information input unit 203 of the portable information terminal 2 (S101).

When a travel start instruction is set in S102, the main movement apparatus transmits the travel start instruction to all subordinate movement apparatuses. After that, the main movement apparatus performs S103 and S104 and waits until safety device information is received from all the subordinate movement apparatuses of the group (S205).

Upon receiving the travel start instruction, the subordinate movement apparatuses recognize a conveyance target (S301), detect a safety device state (S302), and transmit resulting safety device information together with individual identification information to the main movement apparatus (S303).

Upon receiving the safety device information from the subordinate movement apparatuses, the main movement apparatus presents the safety device information of all movement apparatuses in the group in S106. Then, when the start of traveling is consented in S107, consent recording including the safety device information of all movement apparatuses is performed (S108).

Then, a travel control start instruction is transmitted to all the subordinate movement apparatuses (S209) and autonomous traveling control is started (S110).

Upon receiving the travel control start instruction (S304), the subordinate movement apparatuses start the travel control (S305). During the traveling, a drop or a protruding of the conveyance target is detected (S306). When there is no drop or protruding, it is determined whether there is a change in the safety device state (S307). When there is a change, the information presentation unit 104 of the subordinate movement apparatuses presents to the user that the safety device state has changed, and a current safety device state is transmitted together with the individual identification information to the main movement apparatus (S308).

During traveling, the main movement apparatus also determines a change in a safety device state of the subordinate movement apparatuses in step S112. When there is a change, the information presentation unit 104 of the main movement apparatus presents to the user that the safety device state has changed in step S113, and the safety device state is recorded together with the individual identification information.

When there is a drop or protruding in the subordinate movement apparatuses in S306, a travel control is ended (S321), and information indicating that the travel is stopped is transmitted to the main movement apparatus (S322). Then, the information presentation unit 104 presents a reason for stopping the traveling (S323) and the process returns to S300. In step S306, when the user who rides on the subordinate movement apparatus inputs an instruction by touching a "travel stop button" of the information input unit 105 such as the touch panel display or by a sound of stop traveling via the information input unit 105 of the subordinate movement apparatus, the subordinate movement apparatus ends the travel control (S321), and information indicating that the travel is stopped is transmitted to the main movement apparatus (S322). Then, the information presentation unit 104 of the subordinate movement apparatus presents a reason for stopping the traveling (S323), and the process returns to S300.

The main movement apparatus determines whether information indicating that the subordinate movement apparatus has stopped traveling is received during traveling (S214), ends the travel control (S121) when there is a traveling-stopped machine, transmits a traveling stop instruction to all the subordinate movement apparatuses (S222), presents a stop reason (S123), and the process returns to S102.

When the traveling stop instruction is received during traveling (S309), the subordinate movement apparatuses end the travel control (S321), transmit travel stop information (S322), present a reason for stopping the traveling to the information presentation unit 104 (S323), and the process returns to S300.

The subordinate movement apparatuses repeat the processes from S306 until reaching the destination, end the travel control (S311) upon reaching the destination (S310), and transmit information indicating that the travel control has ended together with the individual identification information to the main movement apparatus (S312).

When the main movement apparatus arrives at the destination and ends the travel control, the main movement apparatus wait until receiving information that the travel control has ended from all subordinate movement apparatuses (S217).

When safety measures are taken during traveling, safety measures may be taken according to a lowest safety level among safety levels of all movement apparatuses of the group and the movement apparatuses of the group are not far away from each other.

According to the configuration of the present embodiment described above, in addition to effects of the first and second embodiments described above, even when only a child or a baggage is placed on the movement apparatus 1, an adult riding on the main movement apparatus can perform setting input for the subordinate movement apparatus, and the main movement apparatus and the subordinate movement apparatus can be gathered as a group and move to the destination.

REFERENCE SIGN LIST

1 1, 1A, 1B, 1D Movement apparatus
2 Portable information terminal
3A Parent
3B, 3C Child
3D Baggage
5 Communication network
6 Movement apparatus control center
21 Seat
22 Bumper
23 Front panel
24 Small table
25 Shaft
100 Movement apparatus control unit
101 Travel mechanism
102 Travel mechanism control unit
103 Safety device
103a Safety bar
103b Seat belt
103c Slide wall
104, 104a, 104b Information presentation unit
105, 105a, 105b Information input unit
106, 106a, 106b, 106c Safety device state detection unit
107 Conveyance target recognition unit
108 Conveyance target state detection unit
109 Autonomous traveling control unit
110 Communication unit
111, 111E Storage unit
200 Portable information terminal control unit
201 Communication unit
202 Information presentation unit
203 Information input unit
204 Storage unit

The invention claimed is:

1. A movement apparatus comprising:
   a safety device that is configured to restrain an occupant or a baggage;
      an information input unit that is configured to input consent information that consents a start of traveling in a current state of the safety device; and
   a travel mechanism that starts traveling after the consent information is input,
   wherein the movement apparatus further comprises:
   a WiFi communication device that is configured to communicate information with another movement apparatus of a plurality of movement apparatuses which includes the movement apparatus, and
   a central processing unit (CPU) that is configured to set a main-subordinate relationship in which one of the plurality of movement apparatuses is set as a main movement apparatus and another one is set as a subordinate movement apparatus,
   wherein the main movement apparatus transmits a travel control start instruction to the subordinate movement apparatus when the consent information is input, and
   wherein the subordinate movement apparatus starts traveling only when the travel control start instruction is received from the main movement apparatus.

2. The movement apparatus according to claim 1, wherein the safety device includes any one or more of
   a safety bar that is configured to limit moving of an occupant or a baggage,
   a seat belt that is configured to fix an occupant or a baggage, and
   a slide wall that is housed while stopping and closes exits and entrances while traveling.

3. The movement apparatus according to claim 1, further comprising:
   a storage unit that is configured to record the consent information.

4. The movement apparatus according to claim 3, wherein the consent information is transmitted to an external movement apparatus control center via a communication network.

5. The movement apparatus according to claim 3, wherein the WiFi communication device is configured to communicate with a portable information terminal, wherein when the consent information is input into the portable information terminal, and wherein the consent information and user identification information transmitted from the portable information terminal are stored in the storage unit together with the current state of the safety device.

\* \* \* \* \*